US005702809A

United States Patent [19]

Tixier et al.

[11] Patent Number: 5,702,809
[45] Date of Patent: Dec. 30, 1997

[54] COMPOSITION FOR AN ANTISTATIC LAYER AND A FILM COMPRISING THIS LAYER

[75] Inventors: Jean-Pierre Tixier, Chalon-Sur-Saone; Annie Francoise Armande Legrand, Dracy Le Fort, both of France

[73] Assignee: Eastman Kodak Company, Rochester, N.Y.

[21] Appl. No.: 661,235

[22] Filed: Jun. 10, 1996

[30] Foreign Application Priority Data

Jun. 12, 1995 [FR] France .................. 95 07167
Dec. 5, 1995 [FR] France .................. 95 14516

[51] Int. Cl.$^6$ .............. B05D 1/36; B32B 7/62; B32B 27/40; C08K 3/10
[52] U.S. Cl. ............ 428/216; 427/407.1; 427/412.6; 427/416; 427/419.2; 427/419.5; 428/215; 428/336; 428/424.4; 428/424.6; 428/424.7; 428/922; 524/277; 524/284; 524/408; 524/590; 524/591; 524/839; 524/847; 524/910
[58] Field of Search .............. 524/408, 277, 524/284, 590, 591, 839, 847, 910; 428/423.1, 424.4, 424.6, 424.7, 522, 334, 335, 336, 213, 215, 216, 922; 427/407.1, 412.4, 416, 419.2, 419.5

[56] References Cited

U.S. PATENT DOCUMENTS

| 4,203,769 | 5/1980 | Guestaux ........... 430/631 |
| 4,571,361 | 2/1986 | Kawaguchi et al. ........... 428/328 |
| 5,366,855 | 11/1994 | Anderson et al. ........... 430/523 |
| 5,514,528 | 5/1996 | Chen et al. ........... 430/530 |

FOREIGN PATENT DOCUMENTS

| 573365 | 12/1993 | European Pat. Off. . |
| 599741 | 6/1994 | European Pat. Off. . |
| 5119433 | 5/1993 | Japan . |
| 66138580 | 5/1994 | Japan . |
| 91/02289 | 2/1991 | WIPO . |
| 93/24322 | 12/1993 | WIPO . |
| 93/24584 | 12/1993 | WIPO . |

*Primary Examiner*—D. S. Nakarani
*Attorney, Agent, or Firm*—Andrew J. Anderson

[57] ABSTRACT

The aqueous composition for antistatic layer according to the invention comprises vanadium pentoxide and a polyurethane which includes no sulfonated groups and which is stable in an acidic medium, the weight ratio of vanadium pentoxide to polyurethane preferably being between 1:200 and 5:1. Polymeric supports coated with such a composition can be used for transparencies for photocopy, for mounting supports in the field of printing, or in photographic or magnetic products and in packaging.

20 Claims, No Drawings

COMPOSITION FOR AN ANTISTATIC LAYER AND A FILM COMPRISING THIS LAYER

BACKGROUND OF THE INVENTION

The present invention concerns an aqueous composition for an antistatic layer, and a film comprising this layer, useful in particular in the fields of printing, electrophotography, photogravure, screen printing, photography, magnetics and packaging. More particularly, the invention concerns an antistatic composition based on vanadium pentoxide and polyurethane which gives layers which are transparent, practically colorless and resistant to abrasion.

A known surface treatment for making a film antistatic consists of coating a polyvinyl alcohol and calcium chloride based layer on this film. The patent FR 2,273,642 describes a polyester film which can be used in printing processes, carrying an antistatic layer which consists of a polyvinyl alcohol or polyvinyl acetate, and calcium chloride. The antistatic properties are not destroyed when these films are drawn out and heat-stabilized, but they depend on ambient humidity.

Mineral antistatic agents are known which enable an antistatic layer to be obtained whose antistatic properties are independent of humidity.

Antistatic plastic films able to be used as a support for electrophotographic materials have been described, for example is U.S. Pat. No. 4,571,361. These films consist of a polyethylene terephthalate support on which there is a conductive layer of fine particles of metal oxides of Zn, Ti, Sn, Sb, etc. The antistatic properties of such films remain good even when at low humidity. However, the transparency is far from satisfactory, since the haze is around 10%.

The use of antistatic layers containing vanadium pentoxide is known, since these layers are highly transparent and their antistatic properties do not depend on variations in humidity.

Patent application WO 91/02289 describes a photographic support comprising a polyester, cellulose acetate film or resin-coated paper coated with an antistatic layer containing vanadium pentoxide, and an overlying barrier layer containing a polymer latex having a hydrophilic functionality. In order to improve the adhesion of the coating compositions to the polyester film base, a polymer substrate layer is applied. The composition for forming the antistatic layer consists of $V_2O_5$ and a polymer binder such as a terpolymer latex of acrylonitrile, vinylidene chloride and acrylic acid.

EP-A-599,741 describes a photographic support similar to the preceding one, except that a heat thickening barrier layer of acrylamide, is placed on the antistatic layer of $V_2O_5$.

In these two documents, the barrier layer prevents the vanadium pentoxide from diffusing out of the antistatic layer, which makes it possible to have permanent antistatic protection. Furthermore, the barrier layer affords excellent adhesion of the antistatic layer, the emulsion layer or the layer controlling the curl.

Vanadium pentoxide is also used to obtain antistatic layers for plates for flexographic printing, that is to say printing by means of rubber plates. EP-A-573,365 describes such a layer applied to the film of a flexographic printing plate. The film comprises a flexible substrate coated with a radiation curable polyurethane layer and a vanadium pentoxide antistatic layer. The vanadium pentoxide layer can also be applied to a flexible top coat layer which is strippable. In this case the antistatic effect is transferred to the photosetting layer after stripping.

Patent application WO 93/24322 describes an antistatic composition consisting of vanadium pentoxide and a sulfonated polymer, such as a sulfopolyester or sulfopolyurethane. Example 18 describes the preparation of a polyethylene terephthalate film coated with a sulfopolyester and vanadium pentoxide layer, useful for transparencies to be used for photocopying. In this patent application there is no example of a film of use in the field of printing or electrophotography that comprises a vanadium pentoxide and sulfopolyurethane based antistatic layer.

The abrasion resistance of vanadium pentoxide antistatic layers can be improved by adding a protective layer to the antistatic layer. Such layers are described in U.S. Pat. No. 5,366,855, in which a coalesced protective layer consisting of film-forming polymeric colloidal particles, such as polyurethanes, and non-film-forming particles, is applied to the antistatic layer of vanadium pentoxide. The layers obtained are resistant to abrasion but have moderate transparency.

It is thus desirable to have available a composition which enables an antistatic layer to be obtained which is at the same time highly transparent, resistant to abrasion and practically colorless, and able to be used in the fields of printing, electrophotography, photogravure and screen printing. The compositions are also useful in photographic or magnetic products, or in transparent or non-transparent packaging, in particular in the packaging of electronic components.

SUMMARY OF THE INVENTION

This problem is solved with the aqueous composition for an antistatic layer according to the present invention, comprising vanadium pentoxide and a polyurethane including no sulfonic groups and stable in an acidic medium, the weight ratio of vanadium pentoxide to polyurethane $V_2O_5$/polyurethane being preferably between 1:200 and 5:1.

The amount of $V_2O_5$ in the antistatic composition is usually less than 3% and preferably less than 1% by weight based on total dried solids, but may be higher depending on the desired characteristics of the final dried layer. However, in general it is preferred to use low amounts of $V_2O_5$ as the layer obtained is less colored, more uniform and has a better adhesion.

For applications such as printing, electrophotography, photogravure and screen printing, a typical aqueous composition according to the present invention comprises as principal constituents between 0.010 and 0.100% vanadium pentoxide, and between 0.025 and 0.300% of a polyurethane including no sulfonic groups and stable in an acidic medium. The aqueous composition can further contain between 0.001 and 0.200% wax and/or between 0.001 and 0.020% matting agent, depending on the final application, all percentages being by weight based on total dried solids.

The invention also concerns a method for obtaining an abrasion-resistant transparent antistatic film comprising coating on a polymeric support, in order, a subbing layer, and an antistatic layer obtained from the aqueous antistatic composition described previously.

Finally, the invention concerns an antistatic film comprising a support having thereon in order a subbing layer and the antistatic layer obtained by coating the aqueous composition described previously on the subbing layer.

DESCRIPTION OF THE PREFERRED EMBODIMENT

The composition according to the invention contains vanadium pentoxide, which makes the antistatic properties of the layer obtained independent of hygrometry. This vanadium pentoxide can be obtained in the form of a colloidal solution or "gel" by the various known methods.

The $V_2O_5$ gel can, for example, be prepared by hydrolysis of oxoalkoxides with a molar excess of deionized water. In this case, the vanadium pentoxide is advantageously prepared in situ from a precursor and an alcohol.

Preferably, the vanadium pentoxide is prepared by the method described in U.S. Pat. No. 4,203,769, consisting of heating vanadium pentoxide to a temperature at least 100° C. above the melting point of $V_2O_5$, and casting the resulting molten mass into water at room temperature. The vanadium pentoxide obtained by this method is in the form of a gel of colloidal particles of $V_2O_5$ in the form of fibres.

The vanadium pentoxide can be doped with lithium, chromium, zinc, niobium or, preferably, silver.

The presence of polyurethane in the composition enables a very hard layer, having permanent antistatic properties, to be obtained. The polyurethane must be compatible with the acidic pH of the vanadium pentoxide gel, that is to say chemically inert in an acidic medium. In the composition according to the invention, a polyurethane is used which includes no sulfonated groups and which is stable in an acidic medium.

Most of the aqueous dispersions of polyurethanes commercially available have a basic pH and are not compatible with the $V_2O_5$ gel which is strongly acidic. If the $V_2O_5$ gel is mixed with a conventional polyurethane having a pH above 7, the fibres of the $V_2O_5$ gel are destroyed at this pH and there is a loss of antistatic properties. If this polyurethane is acidified in order to obtain a composition able to be used in an acidic medium, there is a risk of the polyurethane flocculating in the presence of the $V_2O_5$ gel.

A preferred polyurethane is a linear polyurethane comprising mixed hexamethylene diisocyanate ester recurring units, marketed by Bayer under the name Polyurethane-dispersion V®. This product is an anionic aqueous dispersion with 40% by weight of polyurethane, free of organic solvents. Polyurethane-dispersion V® is miscible with water in any proportion and is stable at pH values of 1 to 13.

In the composition according to the invention, the amount of polyurethane can be as high as 15% by weight without the antistatic layer obtained loosing their transparency. However, to obtain a good antistatic protection, $V_2O_5$ should not be too diluted in the polyurethane and to obtain good physical properties of the antistatic layer, such as a good adhesion, it is necessary to have a sufficient amount of polyurethane. Thus in the composition, the $V_2O_5$/polyurethane ratio is preferably comprised between 1:10 and 1:1 and most preferably between 1:3 and 1:1.

The composition according to the invention can also contain wax, which makes it possible to obtain a surface which is slippery but less sensitive to scratching. The abrasion resistance of the layer is then reinforced. Preferably, the wax used is Carnauba wax dispersed in water. Any other natural or synthetic wax compatible with the composition and the desired aim can be used, for example beeswax, or polyethylene or paraffin wax. The quantity of wax used is chosen according to the slipping coefficient that is to be obtained.

The antistatic composition according to the invention can also contain a matting agent, useful for making the surface of the antistatic layer slightly rough. The matting agents can be chosen from amongst those cited in *Research Disclosure* 36544, IX, D, September 1994, for example polymers or copolymers of α-β-ethylenically unsaturated mono- and di-carboxylic acids, of their esters, half-esters and corresponding sulfonic acids, of styrene, acrylonitrile and fluorinated ethylenes, or finely divided inorganic particles such as varied forms of silica and calcium sulphate, barium sulphate, or zinc oxide. Preferably, polymethylmethacrylate beads or silica in powder or colloidal form are used.

The matting agent must be able to be dispersed easily in the solution without flocculating. It must also be chemically inert. The size of the matting agent particles is between 1 and 10 µm. Preferably, matting agent particles of two different sizes are used, whose ratio by weight is between 1:10 and 1:5.

To facilitate the coating, the compositions according to the invention comprise a low quantity of solids, the remaining being mainly water.

Finally, the antistatic composition according to the invention can comprise a surfactant for assisting the coating operation, and whose quantity is adjusted according to the coating system used. Known surfactants are described in *Research Disclosure* 36544, IX, A, September 1994.

The antistatic composition may be coated on one side or both sides of the support, preferably having thereon a subbing layer. In general, it is located as external layer but may constitute an intermediate layer in multilayer products. Such an antistatic composition can be applied to a transparent polymer support, to form a film according to the invention that is able to be used in the fields of printing, electrophotography, photogravure, screen printing, etc. Such supports are described in *Research Disclosure* 36544, XV, September 1994.

The support is, preferably, a polyester support, such as polyethylene terephthalate (PET), advantageously coated with a subbing layer in order to improve the adhesion of the antistatic layer. A preferred subbing layer is obtained from a dispersion containing a polymer latex such as a latex of a terpolymer of acrylonitrile, vinylidene chloride and acrylic acid. The adhesion of the subbing layer on the support can be further improved by introducing in the polymer latex dispersion a material enabling bonds to be created during drying between the terpolymer and the PET, such as resorcinol, in a quantity preferably between 0.1 and 1% by weight.

The antistatic composition can be spread with a Mayer bar, by air knife coating, roll coating, dip coating, spin coating, bead coating, curtain coating or spray coating.

The quantity of antistatic composition which can be applied on the support may vary considerably. The $V_2O_5$/polyurethane coverage may vary from 0.5 mg/m² to 100 mg/m², but it can be higher, for example up to 6 g/m², if necessary. Preferably, in the application as transparency for photocopy or mounting support, the coverage is about 10 mg/m².

The thickness of the antistatic layer obtained can be up to 5 µm, but preferably, it is less than 0.5 µm. For applications as transparency for photocopy or mounting support, the thickness of the antistatic layer is between 0.005 and 0.05 µm.

In the film according to the invention, the thickness of the subbing layer is more than 0.01 µm and preferably less than 5.0 µm. Preferably in the application as transparency for photocopy or mounting support, the thickness of the subbing layer is between 0.02 and 0.20 µm.

When the film according to the invention is used as a mounting support for graphic arts, it must be very resistant to abrasion, since the user tends to rub it each time before use. This is why the presence of the wax is essential in order to provide a sufficiently smooth and strong surface. On the other hand, it is not desirable to introduce a matting agent into the composition, which would increase its roughness needlessly.

When the film according to the invention is used as a transparency for overhead projection, the presence of wax is not essential. The matting agent, on the other hand, is very important. This is because the matting agent affords, on the one hand, a surface roughness which is necessary in order for the transparency to be drawn into the photocopier and, on the other hand, avoids Newton's rings when two transparencies are placed one on top of the other. This is notably the case with automatic-feed photocopiers where the transparencies are stacked up.

The surface resistivity of the antistatic layer of the transparencies must not be less than $5.10^9$ Ω/□, otherwise the toner would not be attracted and the image obtained would be of very poor quality. (The resistivity in ohms per square (Ω/□) represents the electrical resistance of a square of thin film of material measured in the plane of the material between the opposite sides of the square. Its value does not depend on the size of the square).

EXAMPLE 1

Application as a Montage Medium

A $V_2O_5$ gel doped with 4% silver was prepared according to the method in U.S. Pat. No. 4,203,769. The $V_2O_5$ gel had a pH of 3.4. 24.7 g of this gel was diluted in 400 ml of deionized water, and then 400 g of a 0.5% aqueous dispersion of polyurethane was added, obtained by dilution of Polyurethane-dispersion V®, 2 g of p-nonyl phenoxy polyglycol, available commercially under the name Olin 10G Surfactant®, and 16 g of a 13.4% by weight Carnauba wax dispersion, at ambient temperature. An aqueous composition was thus obtained which contained 0.021% by weight $V_2O_5$ and 0.05% polyurethane, having a pH of 3.5.

This composition was applied by coating, using an overflow tank and an air knife, each side of a polyethylene terephthalate (PET) support, with a subbing layer consisting of an aqueous dispersion containing 4% by weight of a terpolymer latex of acrylonitrile, vinylidene chloride and acrylic acid, 0.5% of resorcinol and 0.3% of saponin.

The antistatic film obtained was then dried at 115° C.

The thickness of the subbing layer was 0.03 μm and the thickness of the antistatic layer was 0.015 μm.

The film obtained in this example was subjected to tests related to antistatic properties, resistance to scratching and finger marks, transparency and coloration.

The antistatic properties were tested using the method used for mounting supports, by rubbing the surface three times with a cotton handkerchief, and then placing the film over ashes. If the ashes adhere to the surface of the film, the antistatic layer is not sufficiently efficacious. After the film in this example had been rubbed three times ten times over, the ash did not adhere to the surface of the film, which shows that the antistatic properties are excellent.

The surface resistivity measured by charge kinetics was around $10^7$ Ω/□.

Abrasion resistance was assessed through visual observation of the scratches resulting from the rubbing of the surface of the film with a handkerchief or the even application of moving fine sandpaper ballasted by a weight. Very little scratching was observed.

When the montage support was handled, no finger marks were observed.

Haze was measured using the AFNOR method, by measuring the quantity of light diffused through the support in relation to the quantity of light transmitted when it receives a light beam at 90°. The haze of the film in the example was very low, at around 2%.

The color measurements carried out in the CIE LAB system gave the following results:

L*=95.2
a*=−0.8
b*=1.5.

These results showed that the coloration was very low and the visual clarity of the color (L) was very high.

EXAMPLE 2

Application as a Transparent Antistatic Film

An antistatic composition was prepared as in Example 1, except that polymethylmethacrylate beads in two different sizes were added as a matting agent, namely 0.010% by weight of 4 μm beads and 0.001% of 8 μm beads, and no wax was used. The thickness of the substrate layer was also 0.03 μm, while the thickness of the antistatic layer in this case was 0.010 μm.

The surface resistivity of the film measured by charge kinetics was $10^{10}$ Ω/□.

Ash and scratch resistance tests yielded results similar to those obtained in Example 1. Here again, the antistatic properties and abrasion resistance were excellent.

In general terms, the haze of commercially available transparencies is, at best, 5%. In the case of the transparent film according to the invention, haze of less than 1% was measured.

Finally, the color measurements carried out in the CIE LAB system yielded results similar to those in Example 1.

Further tests were carried out in order to observe the quality of printing, in particular that of solids obtained on the transparency. The solids obtained had a maximum optical density of around 1.15, while for commercially available transparencies it is between 0.9 and 1.15.

The strength of these solids was then assessed. On a conventional support, when the solid is scratched with a fingernail, it comes away very rapidly, that is to say after a single scratch, or five scratches at the most. The solid obtained on the film of the present invention did not come away even after ten scratches.

Using a thread counter, the width of a fold on the solid was also measured. For a commercially available transparency, the width of the fold is up to 0.05 mm. In the case of the present invention, folding left no trace.

The transparent films according to the invention have all the qualities required for a transparency to be used in photocopying.

We claim:

1. Aqueous composition for an antistatic layer comprising vanadium pentoxide and an aqueous dispersion of a polyurethane characterized in that the polyurethane includes no sulfonated groups and is resistant to flocculation in an acidic medium.

2. Aqueous composition according to claim 1 wherein the amount of vanadium pentoxide in the aqueous composition is less than 3% by weight based on the total dry weight of the composition and the weight ratio of vanadium pentoxide to polyurethane is between 1:200 and 5:1.

3. Aqueous composition according to claim 2 wherein the amount of vanadium pentoxide in the antistatic composition is less than 1% by weight based on the total dry weight of the composition and the weight ratio of vanadium pentoxide to polyurethane is between 1:10 and 1:1.

4. Aqueous composition according to claim 1 comprising between 0.010 and 0.100% vanadium pentoxide and between 0.025 and 0.300% of a polyurethane including no sulfonated groups and resistant to flocculation in an acidic medium, the percentages being by weight based on the total dry weight of the composition.

5. Aqueous composition according to claim 4, further containing between 0.001 and 0.200% wax, the percentages being by weight based on the total dry weight of the composition.

6. Aqueous composition according to claim 4, further containing between 0.001 and 0.020% matting agent, the percentages being by weight based on the total dry weight of the composition.

7. Aqueous composition according to claim 1, wherein the vanadium pentoxide is in the form of a colloidal solution.

8. Aqueous composition according to claim 1, wherein the polyurethane is a polyurethane comprising hexamethylene diisocyanate ester recurring units.

9. Aqueous composition according to claim 8, wherein the polyurethane is used in the form of an anionic aqueous dispersion.

10. Aqueous composition according to claim 5, wherein the wax is Carnauba wax.

11. Aqueous composition according to claim 6, wherein the matting agent is polymethylmethacrylate beads, silica in powder form, or silica in colloidal form.

12. Method for obtaining a light-transmitting transparent antistatic abrasion-resistant film comprising 1) applying a subbing layer on a light-transmitting polymeric support,
2) coating the subbing layer obtained in 1) with the aqueous composition according to claim 1, and
3) drying the coated aqueous composition.

13. Antistatic film comprising a polymeric support, a subbing layer, and an antistatic layer, wherein the antistatic layer is formed by coating the aqueous composition according to claim 1 on the subbing layer and drying the coated aqueous composition.

14. Antistatic film according to claim 13, wherein the subbing layer is formed by coating a dispersion comprising a polymer latex and resorcinol on the polymeric support.

15. Antistatic film according to claim 14, wherein the subbing layer polymer latex is a terpolymer latex of acrylonitrile, vinylidene chloride and acrylic acid.

16. Antistatic film according to claim 13, wherein the thickness of the antistatic layer is less than 5 µm.

17. Antistatic film according to claim 13, wherein the thickness of the antistatic layer is between 0.001 and 0.05 µm.

18. Antistatic film according to claim 17, wherein the thickness of the antistatic layer is between 0.005 and 0.05 µm, and the thickness of the subbing layer is between 0.02 and 0.20 µm.

19. Antistatic film according to claim 13, wherein the weight ratio of vanadium pentoxide to polyurethane in the coated antistatic layer is between 1:200 and 5:1.

20. Antistatic film according to claim 19, wherein the weight ratio of vanadium pentoxide to polyurethane is between 1:10 and 1:1.

* * * * *